United States Patent
Auman et al.

(10) Patent No.: US 6,348,245 B1
(45) Date of Patent: Feb. 19, 2002

(54) POLYMIDE PHOTO ALIGNMENT FILM FROM 3,3',4,4'-BENZOPHENONE TETRACARBOXYLIC DIANHYDRIDE AND ORTHO-SUBSTITUTED AROMATIC DIAMINES FOR LIQUID CRYSTAL DISPLAYS

(75) Inventors: Brian Carl Auman, Newark; Melvin P. Zussman, Wilmington, both of DE (US); Bernd Fiebranz, Munster-Altheim (DE); Edgar Böhm, Taipei (TW)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/645,621

(22) Filed: Aug. 25, 2000

Related U.S. Application Data

(62) Division of application No. 09/082,623, filed on May 21, 1998, now Pat. No. 6,139,926.

(51) Int. Cl.[7] ............... C09K 19/38; B32B 27/00
(52) U.S. Cl. ............ 428/1.26; 428/1.25; 428/473.5
(58) Field of Search ............... 428/1.2, 1.25, 428/1.26, 473.5; 252/299.4

(56) References Cited

U.S. PATENT DOCUMENTS

| | | | | | |
|---|---|---|---|---|---|
| 5,129,727 | A | * | 7/1992 | Hanyu et al. | 359/75 |
| 5,135,678 | A | * | 8/1992 | Murata et al. | 252/299.4 |
| 5,612,450 | A | * | 3/1997 | Mizushima et al. | 528/353 |
| 5,759,442 | A | * | 6/1998 | Auman et al. | 252/299.4 |
| 5,846,452 | A | * | 12/1998 | Gibbons et al. | 252/299.4 |
| 5,858,273 | A | * | 1/1999 | Asaoka et al. | 252/299.4 |

OTHER PUBLICATIONS

Yasufumi Iimura et al., Photo–Alignment Control of LC and Its Applications to LCD Fabrication, *SPIE*, 3297, 8–18, Jan. 1998.

* cited by examiner

*Primary Examiner*—Shean C. Wu

(57) ABSTRACT

The present invention relates to polyimide photo alignment films for liquid crystal display devices comprising an aromatic tetracarboxylic dianhydride component containing 3,3',4,4'-benzophenone tetracarboxylic dianhydride and an aromatic diamine component containing at least one diamine of the group of fofmulae AI to AIII as given in the text. Further display devices and methods of their fabrication employing a photo alignment process are disclosed.

2 Claims, No Drawings

POLYMIDE PHOTO ALIGNMENT FILM FROM 3,3',4,4'-BENZOPHENONE TETRACARBOXYLIC DIANHYDRIDE AND ORTHO-SUBSTITUTED AROMATIC DIAMINES FOR LIQUID CRYSTAL DISPLAYS

This is a division of Application No. 09/082,623 filed May 21, 1998, now U.S. Pat. No. 6,139,926.

BACKGROUND OF THE INVENTION

1. Field of the Invention

The present invention relates to a polyimide alignment film based on 3,3',4,4'-bnzophenone tetracarboxylic dianhydride (BTDA) and m-or p-phenylene diamines or 1,5-diaminonaphthalenes, which are substituted ortho to the amino groups with alkyl groups containing from 1 to 4 carbon atoms, such as 2,3,5,6-tetramethyl-p-phenylene diamine (DAD) or 2,4,6-trimethyl-m-phenylene diamine (DAM), and to a liquid crystal display device using such an alignment film.

2. Description of the Prior Art

Liquid crystal display (LCD) devices have become increasingly important in displays which require very low consumption of electrical power or where the environment dictates a lightweight, planar, flat viewing surface. Thus, LCD's are used in display devices such as wristwatches, pocket calculators and personal computers, aircraft cockpit displays, etc.

In its simplest form a liquid crystal display device consists of a liquid crystal layer with opposite sides, a set of electrodes on either side of the liquid crystal layer and an alignment layer between each set of electrodes and the liquid crystal layer. The electrodes bearing the alignment layer are supported by substrates typically of glass or plastic. Alignment of the liquid crystal molecules occurs at a certain angle, referred to as the surface tilt angle or simply as the tilt angle, with respect to the plane of the inside of two substrates, e.g. glass plates, plastic sheets, quartz plates or others, which support the electrodes. The inside of the substrates have coatings of sets of transparent electrodes (electrical conductors), usually made of indium-tin oxide (ITO). The sets of electrodes are patterned, e.g. by etching, compatible with the information to be displayed by the LCD and with its driving method. Displays using the TN or the STN effect use electrodes on opposite sides of the liquid crystal layer in order to achieve the predominantly vertical electrical field required for the switching of the liquid crystals in these display modes. The TN effect is e.g. widely exploited in so called active matrix TN displays, which feature electronic active switching elements (e.g. TFTs or diodes) in each pixel. TN-displays are already widely used, for example in monitors for lap-top computers. Another display mode is the in-plane-switching (IPS) mode. Here the electrodes of one pixel are on the same side of the liquid crystal layer and switching is achieved by an essentially horizontal electrical field, i.e. an electrical field which is essentially parallel to the liquid crystal layer. IPS displays are frequently addressed by a matrix of active elements (typically of TFTs). The process of establishing an alignment layer is most easily carried out by applying the orientation material (an organic polymer) via solution casting (spin coating, roller coating, dipping, spraying, printing and/or doctor blading) onto the substrates. After removal of the solvents and/or curing of the polymer layers, in most conventional displays the substrates are usually rubbed or buffed in one direction with cloths to establish an unique optical direction. After rubbing both substrates, they are rotated from 0 to 360 degrees with respect to each other, adhered together using organic adhesives and often appropriate spacers to preserve a constant thickness to a space or gap between the substrates; and filled with various mixtures of liquid crystal materials. At this stage, polarizing films and/or compensation films are often attached to the outside surfaces of the substrates by a lamination process. Finally, electrical connections are made to both substrates in a manner consistent with the electrical and display designs.

Presently the use of rubbed polymer films, i.e. alignment direction and tilt angle controlling films, dominates the process technology used in the production of all categories of liquid crystal displays, and polyimides are the most common alignment films in use today.

However it is a process hardly compatible with the required clean room conditions in the production of most LCDs, especially active matrix addressed LCDs. Utmost care has to be taken to prevent the rubbing wheels or rubbing cylinders, which usually are covered by cloths like velvet, from dusting and giving off tiny threads which both lead to defects in the orientation of the liquid crystals and thus to defective displays. A further problem of the rubbing method is the generation of electrostatic charges which are able to damage the electronic switching elements of the active matrix.

Another method used in the orientation of liquid crystals is the oblique evaporation of inorganic materials like silicon-oxide ($SiO_x$) onto the substrate surfaces. This method, however, is hardly suited for the mass production of LCDs, especially of LCDs with larger display areas, as handling of the substrates under vacuum is difficult in particular for large substrates. And further, uniform tilt angles are hard to achieve over wide substrate areas Last but not least, oblique evaporation generally yields rather high surface tilt angles of as much as 30°, which are not suited for most practical applications A review of conventional alignment controlling techniques is given, for example, by I. Sage in Thermotropic Liquid Crystals, edited by G. W. Gray, John Wiley & Sons, 1987, pages 75 to 77 and by J. M. Geary et al. in Journal of Applied Physics, Vol. 62(10), 1987, pages 4100–4108.

In contrast to these methods, photoalignment of liquid crystal offers significant advantages. Photoalignment of liquid crystals is characterized by the alignment of liquid crystals on alignment surfaces treated by or subjected to light The expression light here includes not only the visible spectrum of electromagnetic radiation but also the adjacent wavelength regions, especially the UV-range As a contact-free and especially dust-free method, it is of high interest for the production of liquid crystal displays.

Photoalignment of LCs in LCDs has been proposed by M. Schadt et al., Japanese Journal of Applied Physics 31, p. 2155 (1992) using photo-cross linking of polyvinylcinnamate. However neither the capability of this material for the orientation of liquid crystals, nor especially the stability of the alignment after temperature load was sufficient for practical applications.

Moreover, the tilt angle and its magnitude are very important in the various electro-optic modes and the electro-optic properties of the resulting LCD devices. The stability, legibility and reliability of the LCD are all related to the magnitude and stability of the tilt angle. The tilt angle has to be stable towards high temperature and illumination, and the magnitude of the tilt angle has to be stable to long storage in order to provide a long operational life time for the displays. This holds particularly for the value of the tilt angle obtained after the heat treatment of the display after or during sealing of the cells filled with liquid crystals.

Polyimide films used to control the alignment direction and the tilt angle of the liquid crystal molecules in liquid crystal displays are very thin, generally being on the order of from 100 to 2000 angstroms. In the case of photo aligned orientation layers the alignment is induced in a unique direction of the polyimide polymer by illumination with polarized UV-light. The tilt angle is induced by irradiation of the substrates at a pre-determined angle of incidence. The actual tilt angle obtained is a function of polymer ordering on the surface, the resulting surface energy and the illumination angle and illumination intensity. In addition to these variables, each of the hundreds of commercial liquid crystal formulations interacts differently with a given surface. In general, however, the single most important factor determining the value range of the tilt angle is the intrinsic character of the polyimide used to control this angle. Twisted nematic (TN) LCDs, including active matrix (AM) TN LCDs, such as those used in pocket TV sets and watches, generally require lower tilt angles in the range of 1 to 5 degrees. Supertwisted nematic (STN) LCDs require higher tilt angles, typically between 4 to 30 and particularly between 5 to 15 degrees. Whereas IPS displays, as described e.g. in DE 4000451, EP 0 588 568 and EP 0 644 452, require rather low tilt angles of 0 to 5 degrees and preferably of 0 to 2 degrees.

Thus, polyimide alignment films for liquid crystal displays must exhibit certain key properties including stable and predictable alignment of liquid crystal molecules and a sufficient tilt angle for the envisaged application. In addition, for active matrix displays, the polyimide alignment film must also have a high value of the so-called voltage holding ratio (VHR). The active matrix electrode layer comprises nonlinear addressing elements such as, for example, thin film transistors (TFT), metal-insulator-metal (MIM) diodes or metal-silicon nitride-indium tin oxide (MSI) diodes which are integrated with the image point. In TN displays each image point represents a capacitive load with respect to the particular active nonlinear element, which is charged at the rhythm of the addressing cycle. In this cycle, it is of paramount importance that the voltage applied to an addressed image point drops only slightly until the image point is again charged in the next addressing cycle. A quantitative measure of the drop in voltage applied to an image point is the voltage holding ratio (VHR) which is defined as the ratio of the drop in voltage across an image point in the non-addressed state to the voltage applied. A process for determining the VHR is given, for example, by B. Rieger et al., in Conference Proceedings der Freiburger Arbeitstagung Flüssigkristalle (Freiburg Symposium on Liquid Crystals), Freiburg, 1989. The influence of the resistivity of the liquid crystals on the performance of IPS displays is less pronounced than in TN displays however IPS displays cannot tolerate too low VHR values as electro-optical systems having a low or relatively low VHR show insufficient contrast.

For active matrix applications, polyimide alignment films based on 2,2-bis(3,4-dicarboxyphenyl) hexafluoropropane dianhydride (6FDA) and 3,3',4,4'-benzophenone tetracarboxylic dianhydride (BTDA) as the tetracarboxylic dianhydride component and e.g. 2,3,5,6-tetramethyl-p-phenylene diamine (DAD) as the diamine component are used employing the rubbing method (EP appln. No. 96115528).

Alignment layers for IPS displays are disclosed e.g. in EP 0 644 452, JP 07-043 716, JP 07-261 180 and JP 07 261-181, all of which employ the rubbing method.

Typically, alignment layers for active matrix displays are pre-imidized, soluble polyimides which eliminate the need for high cure temperatures and only require removal of the solvent. The rigidity of the tetracarboxylic dianhydrides disclosed in the reference suggests that none of the resulting polyimides would. be expected to have the required solubility in solvents typically used for this process.

U.S. Pat. No. 4,912,197, issued on Mar. 27, 1990, discloses highly soluble, opaque to clear aromatic polyimides derived from 2,2-bis-(3,4-dicarboxyphenyl) hexafluoropropane dianhydride (6FDA), which can be partially replaced with 3,3',4,4'-benzophenone tetracarboxylic dianhydride (BTDA), and 2,4,6-trimethyl-m-phenylene diamine (DAM) or 2,3,5,6-tetramethyl-p-phenylene diamine (DAD).

U.S. Pat. No. 5,532,110, issued on Jul. 2, 1996, also discloses a photoimageable polyimide coating derived from DAM or DAD and 6FDA which can be replaced with BTDA to a certain extent. The polyimide is used as a coating for microelectronic applications which is imagewise exposed and selectively etched to form a pattern U.S. Pat. No. 4,629,777, issued on Dec. 16, 1986, describes radiation-sensitive polyimides prepared from ortho-substituted diamines and BTDA, specifically from DAM or DAD and BTDA.

European Patent application 0 365 855, published on May 2, 1990, discloses a polyimide derived from DAD and a tetracarboxylic acid dianhydride such as STDA. The rubbed polyimide is used as an alignment layer for LCO devices.

However, there is no disclosure in the above documents of a photo alignment layer for a liquid crystal display consisting of a BTDA/DAM or DAD polyimide.

SUMMARY OF THE INVENTION

The present invention provides a polyimide alignment film for photo aligning a liquid crystal layer of a liquid crystal display device comprising an aromatic tetracarboxylic dianhydride component containing from 50 to 100 mole %, based on the total molar amount of aromatic tetracarboxylic dianhydride component, of 3,3',4,4'-benzophenone tetracarboxylic dianhydride and an aromatic diamine component containing from 80 to 100 mole %, based on the total molar amount of aromatic diamine component, of at least one aromatic diamine of the group of formulae AI to AIII

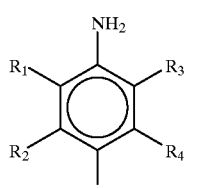

AI

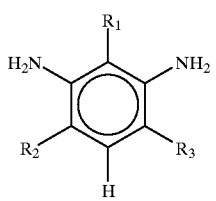

AII

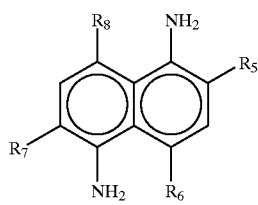

wherein $R_1$ to $R_4$ are alkyl groups containing from 1 to 4 carbon atoms, $R_5$ to $R_8$ which can be the same or different are selected from the group hydrogen, and alkyl group containing 1 to 4 carbon atoms, with the proviso that at least two of $R_5$ through $R_8$ are alkyl groups, and wherein said polyimide alignment film provides said liquid crystal layer with a tilt angle in the range from 0° to 5° and with a voltage holding ratio of greater than 95%, more preferably greater than 98% and most preferably greater than 99%.

In a preferred embodiment of the invention, the polyimide alignment film can also be adapted to provide the liquid crystal layer with a constant tilt angle of 1 degree or more by incorporation of up to 20 mole % of an additional aromatic diamine containing pendant alkyl, fluoroalkyl or perfluoroalkyl groups containing from 1 to 16, preferably from 4 to 10 and most preferably from 8 to 10 carbon atoms.

The present invention further provides a liquid crystal display device comprising:

(a) a liquid crystal layer having opposite sides;

(b) a set of electrodes on either side of said liquid crystal layer or on one side of said liquid crystal layer; and (c) a polyimide alignment film layer, between at least one set of electrodes and said liquid crystal layer, comprising an aromatic tetracarboxylic dianhydride component containing from 50 to 100 mole %, based on the total molar amount of aromatic tetracarboxylic dianhydride component, of 3,3',4,4'-benzophenone tetracarboxylic dianhydride and an aromatic diamine component containing from 80 to 100 mole %, based on the total molar amount of aromatic diamine selected from the group component, of an aromatic diamine of the formulae AI to AIII

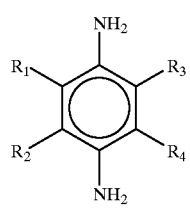

AI

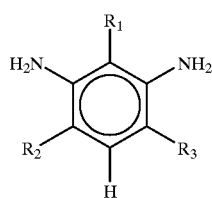

AII

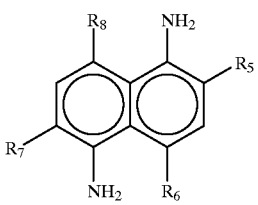

AIII wherein $R_1$ to $R_4$ are alkyl groups containing from 1 to 4 carbon atoms and $R_5$ to $R_8$ which can be the same or different are selected from the group hydrogen, and alkyl group containing 1 to 4 carbon atoms, with the proviso that at least two of $R_5$ through $R_8$ are alkyl groups.

The liquid crystal displays of the present invention are characterized by having tilt angles of 0 degrees to 5 degrees, preferably of 0 to 2 degrees, which are maintained at the upper LCD operating temperature and even after storage under adverse conditions.

DETAILED DESCRIPTION OF THE INVENTION

The polyimide used as a photo alignment film layer in the liquid crystal display device of the present invention is the polymerization-imidization reaction product of an aromatic tetracarboxylic dianhydride component with an aromatic diamine component.

The aromatic tetracarboxylic dianhydride component comprises from 50 to 100 mole %, preferably from 60 to 100 mole %, and especially preferably from 70 to 100 mole % of 3,3',4,4'-benzophenone tetracarboxylic dianhydride. The aromatic tetracarboxylic dianhydride component may, in addition, contain from 0 to 50 mole %, preferably from 20 to 40 mole %, of other tetracarboxylic dianhydrides or other functional derivatives such as tetracarboxylic acids or esters or mixtures thereof.

Tetracarboxylic dianhydrides that can be used in combination with the 3,3',4,4'-benzophenonetetracarboxylic dianhydride include, but are not limited to, 3,3',4,4'-biphenyltetracarboxylic dianhydride, 2,3,3',4'-biphenyltetracarboxylic dianhydride, 2,2-bis(3,4-dicarboxyphenyl)-hexafluoropropane dianhydride, 2,2-bis-(3,4-dicarboxyphenyl)propane dianhydride, 1,4,5,8-naphthalenetetracarboxylic dianhydride, 2,3,6,7-naphthalenetetracarboxylic dianhydride, 1,2,5,6-naphthalenetetracarboxylic dianhydride, bis(3,4-dicarboxyphenyl)sulfone dianhydrde, 1,1-bis(2,3-dicarboxyphenyl)ethane dianhydride, 1,1-bis(3,4-dicarboxyphenyl)ethane dianhydride, bis(2,3-dicarboxyphenyl)methane dianhydride, bis(3,4-dicarboxyphenyl)methane dianhydride, oxydiphthalic dianhydride, thiodiphthalic dianhydride, 1,4-bis(3,4-dicarboxyphenoxy)benzene dianhydride, 1,3-bis(3,4-dicarboxybenzoyf)benzene dianhydride, pyromellitic dianhydrde, 9,9-bis(trifluoromethyl)-2,3,6,7-xanthenetetracarboxylic dianhydride, 9-phenyl-9-(trifluoromethyl)-2,3,6,7-xanthenetetra-carboxylic dianhydride, 2,3,5,-tricarboxycyclopentyl acetic acid dianhydride and cyclobutanetetracarboxylic dianhydride. These tetracarboxylic dianhydrides may be used alone or in combination. 2,2-bis(3,4-dicarboxyphenyl)hexafluoropropane dianhydride (6FDA) is a particularly preferred tetracarboxylic dianhydride for use in combination with 3,3'4,4'-Benzophenonetetracarboxylic dianhydride (BTDA).

When the tetracarboxylic dianhydride component to be polymerized with the aromatic diamine component contains less than 50 mole % of 3,3',4,4'-benzophenone tetracarboxylic dianhydride, the capability for photo alignment of the resulting polyimide may be too low.

The aromatic diamine component comprises from 80 to 100 mole %, preferably from 90 to 100 mole %, of at least one aromatic diamine of the formulae AI to AIII

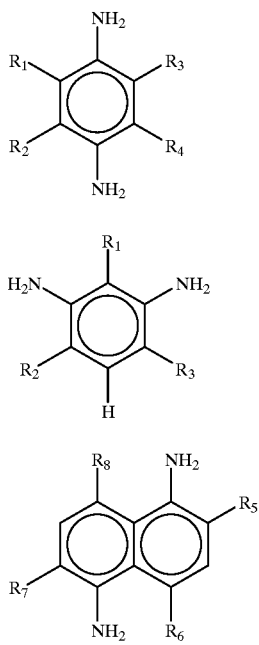

wherein $R_1$ to $R_4$ are linear or branched-chain alkyl groups containing from 1 to 4 carbon atoms, preferably 1 or 2 carbon atoms and $R_5$ to $R_8$ which can be the same or different are selected from the group hydrogen, and alkyl group containing 1 to 4 carbon atoms, preferably 1 or 2 carbon atoms, with the proviso that at least two of $R_5$ through $R_8$ are alkyl groups. Mixtures of the diamines AI to AIII may also be used.

For compound AIII, it is preferred that an alkyl group is. placed ortho to the amino group, i.e., at $R_5$ and/or $R_7$.

Suitable aromatic diamines that can be used in the present invention include 1,5-diaminonaphthalene, 2,3,5,6-tetramethyl-p-phenylene diamine, 2,3,5,6-tetraethyl-p-phenylene diamine, 2,3,5,6-tetrapropylp-phenylene diamine, 2,3,5,6-tetraisopropyl-pphenylene diamine, 2,3,5,6-tetrabutyl-p-phenylene diamine, 2,3,5,6-tetraisobutyl-p-phenylene diamine, 2,3-diethyl- 5,6-dimethyl-p-phenylene diamine, 2,5-diethyl-3,6- dimethyl-p-phenylene diamine, 2,-ethyl-3,5,6-trimethyl-p-phenylene diamine, 3-ethyl-2,6-dimethyl-5-propyl-p-phenylene diamine, 3-ethyl-2,5-dimethyl-6-propyl-p-phenylene diamine, 6-butyl-3-ethyl-2-methyl-5-propyl-p-phenylene diamine and 2,4,6-trimethyl-m-phenylene diamine. These aromatic diamines may be used alone or in combination. A preferred aromatic diamine for use in the present invention is 2,3,5,6-tetramethyl-p-phenylene diamine (DAD).

In a particularly preferred embodiment of the present invention, the aromatic diamine component may, in addition, contain from 0 to 20 mole %, preferably from 0 to 10 mole %, of certain aromatic diamine comonomers to provide higher tilt angles of 3 degrees or more required to align super twisted nematic (STN) and active matrix displays (AMD).

Suitable aromatic diamine comonomers include aromatic diamines containing at least one linear or branched alkyl, fluoroalkyl or perfluoroalkyl group containing from 1 to 16, preferably from 4 to 10 and most preferably from 8 to 10 carbon atoms.

The use of fluorinated carbon atom chains, herein abbreviated as RfX (wherein Rf stands for the perfluoroalkyl chain and X refers to the number of perfluorinated carbon atoms in the chain), attached directly to the aromatic diamine ring, i.e., Ar-RfX, without any intervening atoms, such as for example structures having the formulas AIV or AV

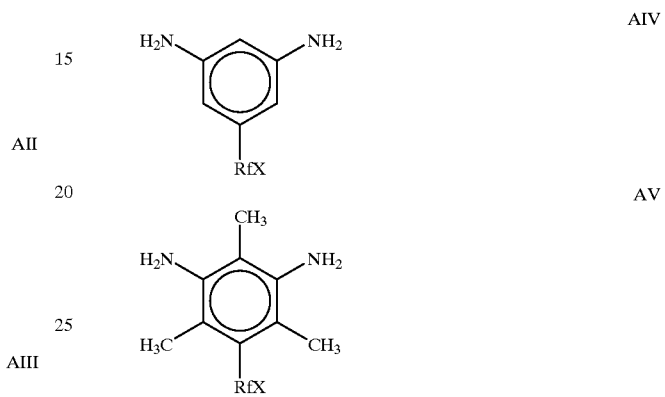

wherein X is from 1 to 16, preferably from 8 to 10, provide adequate voltage holding ratio, together with high tilt angle and are preferred.

In other cases, the RfX group can be attached in very close proximity to the aromatic diamine ring through intervening atoms such as Ar-O-CH$_2$-Rf X, Ar-CH$_2$-Rf X, Ar-C(CH$_3$)$_2$-Rf X, Ar-CH$_2$O-(CH$_2$)$_{1-6}$Rf X, Ar-COO(CH$_2$)$_2$-RfX, Ar-CO-RfX, Ar-COO-C$_6$H$_4$-RfX, Ar-COO-C$_6$H$_4$-ORfX, Ar-CONH-C$_6$H$_4$-RfX, Ar-CONH-C$_6$H$_4$-ORfX or Ar-CONH-RfX, wherein Ar has the formulae A1 or A2

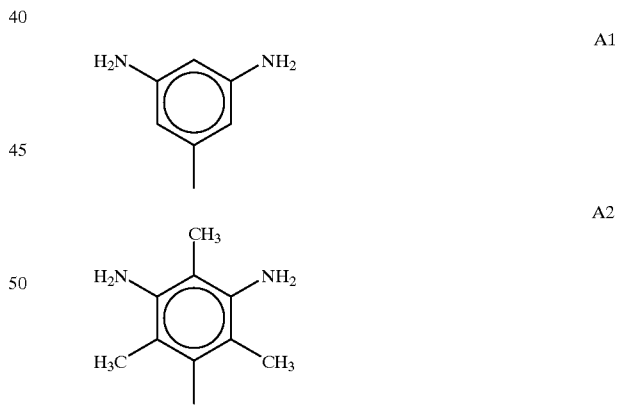

and X is 1 to 16.

Specific examples of alkyl, fluoroalkyl or perfluoroalkyl group containing aromatic diamine comonomers include, but are not limited to, 5-perfluorohexyl-1,3-phenylene diamine, 5-perfluorooctyl-1,3-phenylene diamine, 5-perluorodecyl-1,3-phenylene diamine, 5-perfluorohexyl-1,3-diaminomesitylene, 5-perfluorooctyl-1,3-diaminomesitylene, 5-perfluorodecyl-1,3-diaminomesitylene, 4'-trifluoromethoxyphenyl-3,5-diaminobenzamide 1-[2,2-bis(trifluoromethyl)3,3,4,4,5,5,5-heptafluoropentyl]-3,5-diaminoberizene, 4-(1,1,11- trihydroperfluoroundecyloxy)-1,3-phenylene diamine, 3,5-diamino-1H, 1H,2H,2H-heptafluorodecyl-benzoate, 3,5-diaminodecylbenzoate, and 3,5-diaminohexadecylbenzoate.

Aromatic or aliphatic monoamines can also be used but limit the molecular weight and are less preferred, e.g. N-dodecylamine, perfluorooctyl-3-aminobenzene, N-hexadecyiamine, 1-(4-aminophenyl)dodecane and 1-amino-3-perfluorodecyl-n-propane.

Preferred embodiments of the polymides of the present invention include copolymers containing more than 55 mole %, more preferably more than 80 mole %, and most preferably more than 90 mole % of BTDA as the tetracarboxylic dianhydride component and, preferably, DAD or DAM as the aromatic diamine component. Polyimide homopolymers containing only BTDA as the tetracarboxylic dianhydride and DAD, DAM or 2,4,6,8-tetramethyl-1,5-diaminonaphthalene as the diamine component can also be used as photo alignment films in the present invention.

The liquid crystal displays of the present invention are characterized by having voltage holding ratios of over 95%, preferably over 97%, more preferably over 98% and most preferably over 99%. These high voltage holding ratios are also maintained at the upper operation temperature level of the liquid crystal display device, and are maintained even upon storage under adverse conditions.

The polyimide alignment film of the present invention may be prepared by solution polymerization of substantially equimolar amounts of the aromatic tetracarboxylic acid component and the aromatic diamine component at ambient room temperature to 50° C. in N-methylpyrrolidone or N,N-dimethylacetamide as the solvent.

The resulting poly(amic acid) solution is then imidized by chemical imidization using acetic anhydride and pyridine at room temperature to about 80° C. or by thermal imidization by heating at 150° to 220° C., preferably at 180° to 200° C. The polyimide is precipitated, removed by filtration and dried under vacuum. The polyimide is then dissolved in gamma-butyrolactone solvent and coated by spin coating onto indium-tin oxide (ITO) coated glass plates and then dried at a temperature of from 150° C. to 220° C. for from 1 minute to 2 hours, preferably from 180° to 200° C. for from 30 minutes to 2 hours to form a polyimide coating. The polyimide coating is further subjected to illumination treatment, using polarized electromagnetic radiation, preferably UV-light, to provide an alignment controlling film of the invention. Illumination may be performed at angles of about 10° to 90°. VHR and tilt angle provided by the resulting alignment layer can be influenced to a large extent by varying angle, time and intensity of illumination (e.g. M. Schadt in SID 97 Digest (1997) pp. 397–400). The thickness of the alignment film typically ranges from 100 to 2000 angstroms and can be adjusted by varying the amount of polymer applied or the coating method used.

A pair of the glass substrates covered with the electrodes and coated with the alignment controlling film are placed in opposition to each other, so that the respective alignment films face each other, and are rotated so that their mutual orientation directions (induced e.g. by illumination with polarized UV-light) form a predetermined angle to each other and then are bonded to each other to form a predetermined space by interposing spacers between them or by some other means. An active matrix TN liquid crystal composition, for example, ZLI-4792, (sold by Merck, KGBA, Germany) or an IPS liquid crystal composition for example MLC-6601 and MLC-6614, both of Merck KGBA, Germany, is filled into said space and then the filling hole is sealed with an adhesive.

Light polarizer layers are deposited on both outside glass surfaces. The directions of polarization of the two polarizers are adjusted with respect to each other, depending on the specific cell configuration. The polarizer orientations are described, for example, in European Patent 0 131 216, European Patent 0 260 450 and DE 4000451 respectively, while other orientations can also be used. In active matrix addressed TN displays and in IPS displays, the two directions are either substantially perpendicular or substantially parallel to each other. In TN and STN cells the liquid crystals assume a spiral orientation through the thickness of the layer following the alignment of the liquid crystals by the two alignment layers which have directions from substantially 70° to 360° to each other. Twist angles, from 70° to 120° are particularly preferred for TN displays. Twist angles higher than 90° can be obtained by adding a suitable doping component to the liquid crystal mixture. In IPS displays the liquid crystals can either be twisted (e.g. 90°) or untwisted (e.g. 0°) in the starting orientation.

A particularly preferred liquid crystal photo aligning film of the present invention comprises a polyimide derived from 20 mole % of 2,2-bis(3,4-dicarboxyphenyl) hexafluoropropane dianhydride, 80 mole % of 3,3',4,4'-benzophenonetetracarboxylic dianhydride and 100 mole % of 2,3,5,6-tetramethyl-p-phenylene diamine, which has a very high voltage holding ratio of greater than 98% (measured in a TN cell with ZLI-4792 after 5 minutes at 100° C.), a stable tilt angle of 0 degrees (measured again with ZLI-4792 after 1 hour at 150° C.) using a 200 W metal halogenide lamp and a UV polarization foil under normal incidence and a low residual DC of from 0 to 50 mV (again using ZLI-4792).

Liquid crystal mixtures that can be used in the liquid crystal displays of the present invention include high holding ratio LC mixtures for active matrix addressed twisted nematic displays which are based on superfluorinated materials (SFM's).

The liquid crystal mixtures used in the LCD's according to the present invention preferably contain at least one compound of formula (I).

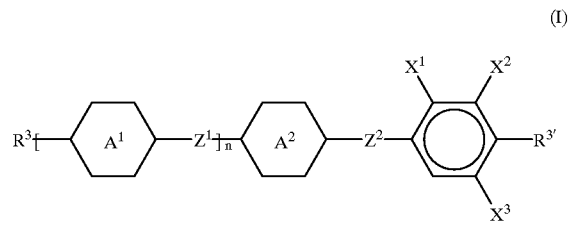

wherein $R^3$ is an alkyl group containing from 1 to 12 carbon atoms wherein, in addition, one or two non-adjacent —CH$_2$-groups can be replaced by —O—, —CO—, —COO—, —OCO— or —CH=CH—;

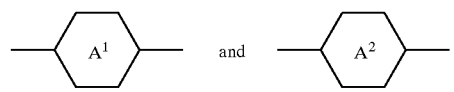

independenty of one another, are trans-1,4-cyclohexylene, 1,4-phenylene, 2-fluoro-1,4-phenylene, 3-fluoro-1,4-phenylene, 2,3-difluoro-1,4-phenylene or 3,5-difluoro-1,4-phenylene, or one of

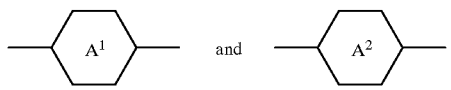

is alternatively pyrimidine-2,5-diyl, pyridine-2,5-diyl or trans-1,4-dioxane-2,5-diyl;

$Z_1$ and $Z_2$, independently of one another, are a direct bond, $-CH_2CH_2-$, $-COO-$, $-OCO-$, $-CH=CH-$ or $-C\equiv C-$;

$X^1$, $X^2$ and $X^3$, independently of one another, are H or F;

$R^3$ is the same as $R^3$ or is Q-Y;

Q is $-CF_2-$, $-OCF_2-$, $-C_2F_4-$ or a direct bond;

Y is H, F, Cl or CN; and n is 0, 1 or 2.

The Proportion of one or more compounds of the formula (I) in the liquid crystal mixtures used according to the invention is Preferably more than 15% by weight and, more particularly, more than 20% by weight. Liquid crystal mixtures containing more than 40% by weight and particularly more than 50% by weight of one or more compounds of the formula (I) are particularly preferred.

The liquid crystal mixtures used according to the invention can contain further components which are preferably selected from nematic or nematogenic (monotropic or isotropic) substances, in particular substances selected from the group consisting of azoxybenzenes, benzylideneanifines, biphenyls, terphenyls, phenyl or cyclohexyl benzoates, phenyl or cyclohexyl cyclohexanecarboxylates, phenyl or cyclohexyl cyclohexylbenzoates, phenyl or cyclohexyl cyclohexyicyclohexanecarboxylates, cyclohexylphenyl benzoates, cyclohexylphenyl cyclohexanecarboxylate, cyclohexylphenyl cyclohexylcyclohexanecarboxylate, phenylcyclohexanes, cycohexylbiphenyls, phenylcyclohexylcyclohexanes, cyclohexylcyclohexanes, cyclohexylcyclohexenes, cyclohexylcydohexenes, 1,4-bis (cyclohexyl)benzenes, 4,4'-bis(cyclohexyl)biphenyls, phenyl- or cyclohexylpyrimidines, phenyl- or cyclohexylpyridines, phenyl- or cyclohexyldioxanes, phenyl- or cyclohexyl-1,3-dithianes, 1,2- diphenylethanes, 1,2-dicyclohexylethanes, 1-phenyl-2-cyclohexylethanes, 1-cyclohexyl-2-(4-phenylcyclohexyl)ethanes, 1-cyclohexyl-2-biphenylylethanes, 1-phenyl-2-cyclohexylphenylethanes, halogenated or unhalogenated stilbenes, benzyl phenyl ethers, tolans and substituted cinnamic acids. The 1,4-phenylene groups in these compounds can also be fluorinated.

The liquid crystal mixtures used in the electro-optical systems according to the invention may also contain one or more dielectrically neutral compounds having formulas (II) to (V).

In the formulas (II) and (III) above, L and E may be identical or different and are each, independently of one another, a divalent radical selected from the group consisting of -Phe-, -Cyc-, -Phe-Phe-,-PheCyc-, -Cyc-Cyc-, -Pyr-, -Dio, -G-Phe- and -G-Cyc- and mirror images thereof. Phe is unsubstituted or fluorine substituted 1,4-phenylene, Cyc is trans-1,4-cyclohexylene or 1,4-cyclohexenylene, Pyr is pydmidine-2,5-diyl or pyridine-2,5-diyl, Dio is 1,3-dioxane-2,5-diyl and G is 2-(trans(-1,4-cyclohexyl)ethyl, pyrimidine-2,5-diyl, pyridine-2,5-diyl or 1,3-dioxane-2,5-diyl. One of the radicals L and E is preferably Cyc, Phe or Pyr. E is preferably Cyc, Phe or Phe-Cyc.

The liquid crystals used in the invention preferably contain one or more components selected from compounds of formulas (II) and (III), wherein L and E are selected from the group consisting of Cyc, Phe and Pyr and simultaneously one or more components are, selected from the compounds of formulas (II) and (III), wherein one of the radicals L and E is selected from the group comprising Cyc, Phe and Pyr and the other radical is selected from the group consisting of-Phe-Phe-, -Phe-Cyc-, -Cyc-Cyc-, -G-Phe- and -G-Gyc-, and, if desired, one or more components are selected from the compounds of formulas (II) and (III), wherein the radicals L and E are selected from the group consisting of -PheCyc-, -Cyc-Cyc- -G-Phe- and -G-Cyc-.

$R^4$ and $R^5$ in the compounds of formulas (II) and (III) are each, independently of one another, preferably alkyl, alkenyl, alkoxy, alkenyloxy or alkanoyloxy having up to 8 carbon atoms. In most of these compounds, $R^4$ and $R^5$ are different from one another, one of $R^4$ and $R^5$ being in particular alkyl, alkoxy or alkenyl.

Especially preferred is the following group of dielectrically neutral compounds of formulas (IV) and (V)

wherein $R^4$ and $R^5$ are the same as described for formulas (II) and (III),

Z is a direct bond or $-CH_2CH_2-$, 1 and p, independently from each other, are 0 or I, and

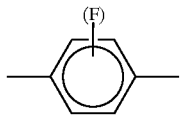

is 1,4-phenylene, 2-fluoro-1,4-phenylene, 3-fluoro-1,4-phenylene or 2,3-difluoro-1,4-phenylene.

The weight proportion of the compounds of formulas (II) to (V) used in the liquid crystal mixtures according to the invention is preferably from 0 to 50% by weight and, in particular, from 0 to 40% by weight.

Liquid crystal compounds according to formula (1) wherein Y is H, F or Cl are defined as SFM materials while compounds with. Y=CN are defined as carbonitrile compounds.

LCD's according to the present invention, which are addressed by an active matrix, preferably contain liquid crystal mixtures which are based on SFM compounds. Especially preferred are actively addressed LCD's, wherein the liquid crystal mixture contains at least 40% by weight and, most preferably, not less than 60% by weight of one or more compounds according to formula (I) wherein Y=H, F or Cl. The liquid crystal mixture of actively addressed LCD's according to the present invention preferably contains less than 20% by weight of carbonitrile compounds, especially less than 10% by weight of carbonitrile compounds and, most preferably, no carbonitrile compounds.

The liquid crystal compounds of formula (I) and compounds of formulas (II) to (V) are known, and are prepared by methods known per se, for example, as described in Houben-Weyl, Methoden der Organischen Chemie [Methods of Organic Chemistry], Stuttgart, 3 Germany.

Specific liquid crystal mixtures used in the present invention include superfluorinated materials which are disclosed, for example, in U.S. Pat. No. 4,302,352, U.S. Pat. No. 4,330,426, WO 89-02,884, WO 91-08,184 and WO 91-03,450.

Liquid crystal mixtures for IPS displays preferably comprise at least one compound of the formula VI

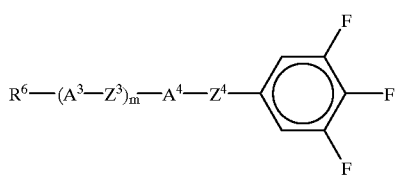 (VI)

in which $R^6$ is H, an alkyl or alkenyl radical having 1 to 15 carbon atoms which is unsubstituted, monosubstituted by CN or $CF_3$ or at least monosubstituted by halogen, where one or more $CH_2$ groups in these radicals may also, in each case independently of one another, be replaced by —O—, —S—,

—CO—O—, —O—CO— or —O—CO—O— in such a way that O atoms are not linked directly to one another, $A^3$ and $A^4$ are each, independently of one another,
  (a) trans-1,4-cyclohexylene radical or 1,4-cyclohecylene radical, in which, in addition, one or more non-adjacent $CH_2$ groups may be replaced by —O— and/or —S—,
  (b) 1,4-phenylene radical, in which, in addition, one or two CH groups may be replaced by N,
  (c) radical from the group consisting of 1,4-dicyclo(2,2,2) octylene, piperidine-1,4-diyl, naphthalene-2,6-diyl, decahydronaphthalene-2,6-diyl and 1,2,3,4-tetrahydronaphthalene-2,6-diyl,
where the radicals (a) and (b) may be substituted by one or two fluorine atoms, $Z^3$ and $Z^4$ are each, independently of one another, —CO—O—, —O—CO—, —$CH_2$—O—, —$OCH_2$—, —$CH_2CH_2$—, —CH=CH—, —C≡C, or a single bond, or one of the radicals $Z^1$ and $Z^2$ is —$(CH_2)_4$— or —CH=CH—$CH_2CH_2$—, and m is 0, 1 or 2;

and/or at lest one compound of the formula VII

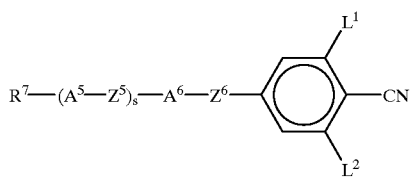 (VII)

in which
  $L^1$ and $L^2$ are independently H or F, in particular in which $L^1$ is F and $L^2$ is H or F,
  $R^7$ is as defined for $R^6$, and
  $A^5$ and $A^6$ are each, independently, as defined for $A^3$ and $A^4$,
  $Z^5$ and $Z^6$ are each, independently of one another, as defined for $Z^3$ and $Z^4$, and
  s is 0, 1 or 2, preferably 0;
optionally at least one compound of the formula VIII $$R^8—(A^7—Z^7)_o—A^8—R^9 \quad \text{VIII}$$

in which
  $R^8$ and $R^9$ are each, independently of one another, as defined for $R^6$,
  $A^7$ and $A^8$ are each, independently of one another, as defined for $A^3$ and $A^4$
  $Z^7$ is in each case, independently of the others, as defined for $Z^3$ and $Z^4$, and
  o is 1, 2 or 3;
and optionally at least one compound of the formula IX

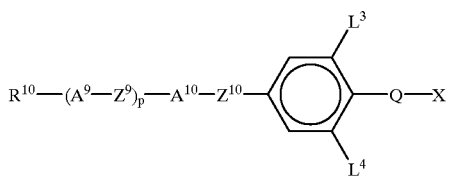 (IX)

in which
  $R^{10}$ is as defined for $R^6$,
  $A^9$ and $A^{10}$ are each, independently of one another, as defined for $A^3$ and $A^4$,
  $Z^9$ and $Z^{10}$ are each, independently of one another, as defined for $Z^3$ and $Z^4$,
  $L^3$ and $L^4$ are each, independently of one another, H or F,
  Q is a polyfluoroalkylene radical of the formula $$—(O)_q—(CH_2)_r—(CF_2)_s—$$

which
  q is 0 or 1
  r is 0 or an integer between 1 and 6 and
  s is an integer between 1 and 6,
  X is H, F or Cl, and
  p is 0, 1 or 2.

Preference is furthermore given to a liquid-crystalline media for IPS displays which comprise at least one compound containing a 3,4,5-trifluorophenyl group, preferably a compound of the formula VI, and/or at least one compound containing a group of the formula VII, in particular which comprise from 10 to 60% by weight, preferably from 15 to 40% by weight, of at least one compound of the formula VI, from 15 to 40% by weight, preferably from 20 to 35% by weight, of at least one compound of the formula VII, from 20 to 55% by weight, preferably from 25 to 50% by weight, of at least one compound of the formula VIll, and from 0 to 30% by weight, preferably from 20 to 25% by weight, of a compound of the formula IX.

Especially preferred liquid crystal mixtures for IPS displays comprise:

at least one compound selected from the formulae VIa and VIb

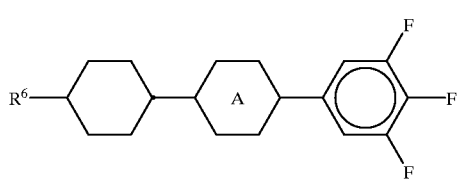

VIa

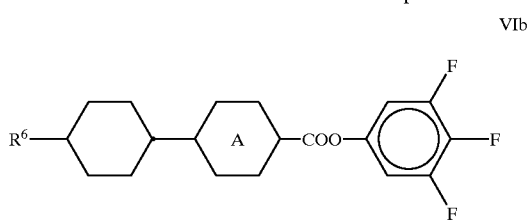

VIb at least one compound selected from the formulae VII1, VII2, VII3 and VII4,

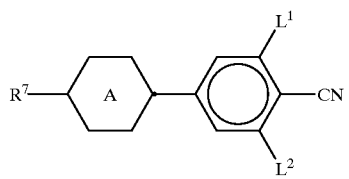

VII1

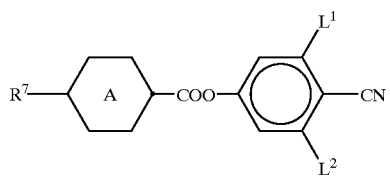

VII2

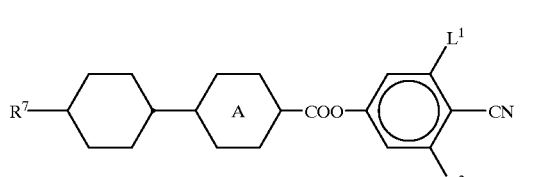

VII3

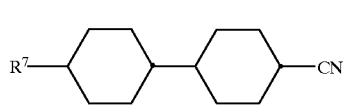

VII4 if desired, at least one compound selected from the formulae VIIIa, VIIIb and VIIIc,

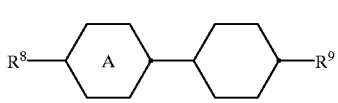

VIIIa

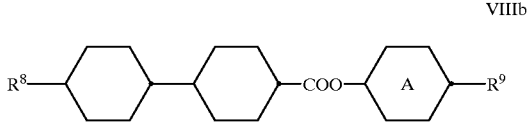

VIIIb

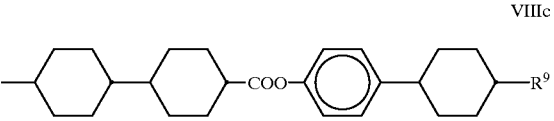

VIIIc and if desired, at least one compound selected from the formulae IXa and IXb,

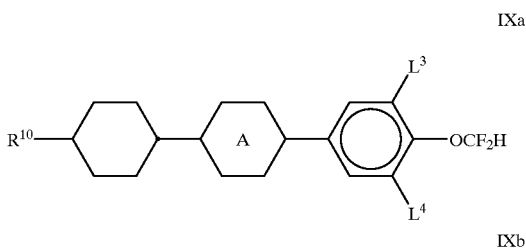

IXa

IXb

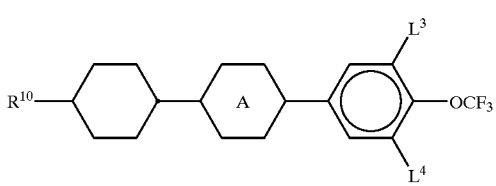

in which $A$ is in each case cyclohexyl, dioxane, fluorocyclohexene, phenyl or fluorophenyl group (as shown), and $R^6, R^7, R^8, R^9, R^{10}, L^1, L^2, L^3$ and $L^4$ are each as defined above.

Specific liquid crystal mixtures used in IPS displays according to the present invention include those disclosed in WO 96-23851.

Preferred LC mixtures of the types described above, are commercially available from Merck KGaA, Darmstadt, Germany under the trademark Licristale.

The present invention is illustrated in more detail by the following examples which, however, do not in any way restrict the scope of the invention.

Glossary

PMDA=pyromellitic dianhydride

BPDA=3,3',4,4'-biphenyltetracarboxylic dianhydride

BTDA=3,3',4,4'-benzophenonetetracarboxylic dianhydride

6FDA=2,2-bis(3,4-dicarboxyphenyl)hexafluoropropane dianhydride

ODPA=oxydiphthalic dianhydride

DAD=2,3,5,6-tetramethyl-p-phenylene diamine

DAM=2,4,6-trimethyl-m-phenylene diamine

MPD=m-phenylene diamine $Rf_8$MPD=5-pefluorooctyl-m-phenylene diamine $Rf_{10}$MPD=5-perfluorodecyl-m-phenylene diamine $Rf_8$DAM=5-perfluorooctyl-1,3-diaminomesitylene TFMO-BA=4'-trifluoromethoxyphenyl-3,5-diaminobenzamide TMB=3,3',5,5'-tetramethyl-4,4'-diaminodiphenyl FDA=9,9-bis(4-aminophenyl)fluorene 1,5-DAN=1,5-diaminonaphthalene MED=3,3'-dimethyl-5,5'-diethyl4,4'-diaminodiphenyl methane NMP=N-methylpyrrolidone GPC $\overline{M}_w$=weight average molecular weight determined by gel permeation chromatography (polystyrene standards)

PI=polyimide

ITO=indium/tin oxide

ZLI-2293=a liquid crystal mixture of cyanophenylcyclohexanes and biphenylcyclohexanes having a clearing point of 85° C., a dielectric anisotropy of 10 (1K Hz,20° C.), an optical anisotropy of 0.1322 (20° C., 589 nm), an ordinary refractive index of 1.4990 and an extraordinary refractive index of 1.6312 (sold by Merck KGBA, Darmstadt, Germany)

ZLI-4792=a liquid crystal mixture consisting of terminally fluorinated liquid crystal compounds including 2-ring compounds like phenylcyclohexanes and 3-ring compounds like biphenyicyclohexanes and 4-ring compounds like cyclohexyl biphenylcyclohexanes having a clearing point of 92° C., a dielectric anisotropy of 5.2 (1 KHz,20° C.), an optical anisotropy of 0.0969 (20° C., 589 nm), an ordinary refractive index of 1.4794 and an extraordinary refractive index of 1.5163 (sold by Merck KGaA, Darmstadt Germany)

MLC-6601=a liquid crystal mixture consisting mainly of fluorinated liquid crystal compounds comprising terminally fluorinated ester compounds and containing directly linked compounds and of low delta n alkenyl compounds with low dielectric anisotropy (sold by Merck KGaA, Germany)

MLC-6614=a liquid crystal mixture consisting of dielectrically positive fluorinated compounds including ester-linked compounds and terminally cyano-substituted phenylcyclohexanes (benzonitriles) containing low birefringent dialkyl compounds (sold by Merck KGaA, Germany)

Measurement of Tilt Angles

Tilt angle measurements were performed using the crystal rotation method described by G. Baur et al, Physics Letter, Vol 56A, No. 2, 1976, pages 142 to 144.

More specifically, tilt angles were measured using a commercially available set up TBA 101 from Autronic Melchers, Karlsruhe, Germany and a customized set up of Merck KGaA, Darmstadt, Germany, of 50 μm thick planar filled with ZLI-4792 unless explicitly stated otherwise. The measurement was performed at a temperature of 20° C., after annealing of the cells, i.e. heating the liquid crystals to the isotropic state. The cell preparation is described in more detail in the following Example 1. The interference signal of a He-Ne laser beam (633 nm) was monitored as a function of the angle of incidence of the rotating anisotropic liquid crystal cell. The tilt angles were determined from the symmetry angle of the interference pattern taking into account the refractive indices of the liquid crystals at 633 nm.

Measurement of Voltage Holding Ratio (VHR)

Voltage holding ratio measurements were made as described by. T. Jacob et al. in Physical Properties of Liquid Crystals, VIII Voltage Holding Ratio, Merck KGaA, Darmstadt, Germany.

More specifically, voltage holding ratio measurements were made using an Autronic Melchers VHRM 100 (Karlsruhe, Germany) at ±1 Volt, 60 Hz refresh rate, 64 μs pulse duration and measurements/cycle in 5 or 6 μm thick planar cell with 90° twisted orientation. The preparation of the cells is described in more detail in Example 1. The liquid crystal mixture used was ZLI-4792, from Merck KHaA, unless explicitly stated otherwise. The cells were thermostated and readings were taken,at 20° C. and after minutes at 100° C.

Measurement of Residual DC (RDC)

The residual DC measurements were performed using the so called "flicker free" method. In this measurement technique the test cell filled with ZLI-4792 was placed on a Mettler hot stage (FP 80) at 60° C. The hot stage was used in conjunction with a Leitz Orthoplan polarizing microscope. The test cell was addressed using a Wavetek (Model 275) function generator. The light throughput was monitored with a photodiode which was built into the path of the optical beam of the microscope. The test cell was first addressed with ±3V square wave, 30 Hz, +3V DC offset voltage for minutes. After this "bum- in" time of minutes the +3V DC offset was switched off. The resulting flicker was monitored and the DC offset voltage was increased until the flickering was no longer visible. The compensating voltage was the residual DC voltage.

The values of all measurements of the tilt angle, the voltage holding ratio and the residual DC given in the following examples are averages of at least two independent measurements of two separate test cells unless explicitly stated otherwise. All physical data given in the examples refer to a temperature of 20° C. unless another temperature is explicitly stated.

EXAMPLE 1

Into a 100 ml reaction kettle equipped with a mechanical stirrer and nitrogen inlet and outlet were charged 2.0258 g (0.0123 mole) of DAD and 22.2 g of NMP. After dissolution of the diamine, 3.9742 g (0.0123 mole) of BTDA were added and rinsed in with 2 g NMP (23.2 g NMP total). The reaction mixture was stirre3d overnight at room temperature under nitrogen. A colorless, viscous poly (amic acid) solution resulted (weight average molecular weight by GPC was 313,000). To this solution were added 3.5 ml (3.8 g) acetic anhydride and 1.6 ml (1.6 g) pyridine. The mixture was heated to 50° C. for 3 hrs, then left stirring at room temperature overnight. The solution was then added slowly and with vigorous stirring to a large excess of deionized water (18 M=resistivity), causing the polymer to precipitate as white stringy solid resin. The resin was repeatedly washed with deionized water and isolated by filtration, then dried under vacuum at 50° C. and 80° C. 3 g of resin were dissolved in 97 g of butyrolactone and filtered through a 1.0 micron filter.

The diluted PI solution was spin coated onto 7-inch X 7-inch ITO coated glass plates (Corning 7069, alkali free glass). The PI coated glass plates were then placed on a hot plate at 100° C. for 1 minute, followed by curing in an air oven at 180° C. for 90 min. The cured film was irradiated with a 200 W metal halogenide lamp (Dr. Hönle GmbH, UVA-Point) through a UV polarization foil (B+W Filter, P-UV2) in a distance of 4 cm for 5 min of an angle of 90° to the surface. For tilt angle measurements, the coated glass plates were assembled with the alignment films facing each other so that their respective orientation directions were anti-parallel to each other. The spacing between the glass plates was set at 50 μm by incorporation of glass fibers into the UV curable adhesive placed around the perimeter of the plates, followed by curing of the adhesive. Two small gaps in the adhesive were left to allow filling of the cell. The liquid crystal mixture was filled into the gap between the plates via capillary action. The completed cell was placed in an oven at 120° C. for 20 minutes to allow for complete isotropization of the LC mixture. The test cells were then cooled and stored at room temperature for 12 hours prior to measurement of the tilt angle. For voltage holding ratio and residual DC measurements, the coated glass plates were assembled so that their respective orientation directions were perpendicular to each other (90° twist). The spacing between the glass plates was set at 6 μm by incorporation of glass fibers into the adhesive around the perimeter of the plates, followed by curing of the adhesive. Two small filling holes were left to allow filling of the cell. The liquid crystal mixture was filled into the gap between the plates via capillary action. The active area (area coated with ITO) was 1 cm$^2$.

The liquid crystal test cell containing the polyimide of Example 1 as alignment layer and ZLI-4792 (Merck KGaA, Darmstadt Germany) as liquid crystal mixture exhibited good alignment under visual inspection with no disclinations, an initial tilt angle of 0°. After post heat treatment of the test cells at 150° C. for 1 hour the tilt angle remained 0°. A high voltage holding ratio, VHR (after 5 minutes at 100° C.) of 99.2% and a low residual DC (RDC) of 30 mV were also obtained. Results are given in Table 1.

These properties were maintained after storage for 4 hours at 80° C.

EXAMPLE 2

In a similar manner to Example 1, another polyimide (BTDA/6FDA/DAD) was prepared and evaluated as photo alignment layer after irradiation under normal incidence for liquid crystal displays. Table I lists the composition of this polymer, the tilt angle, voltage holding ratio (VHR) and residual DC (RDC) results. This photo alignment layer showed only moderate alignment of the liquid crystal. Many disclinations (enclosing small misaligned areas) were observed by visual inspection.

The tilt angle was 0°. After temperature load (20 min, 120° C.) the alignment became worse. It was even too poor to reliably determine the tilt angle.

EXAMPLE 3

Into a 100 ml reaction kettle equipped with a mechanical stirrer and nitrogen inlet and outlet were charged 2.9845 g (0.0187 mole) of DAD, 0.7197 g (0.0014 mole) of RF8MPD and 36 g of NMP. After dissolution of the diamines, 6.2958 g (0.0195 mole) of BTDA were added and rinsed in with 4 g NMP (40 g NMP total). The reaction mixture was stirred overnight at room temperature under nitrogen. A colorless, viscous poly (amic acid) solution resulted (weight average molecular weight by GPC was 293,000). To this solution were added 5.5 ml (6.0 g) acetic anhydride and 2.5 ml (2.5 g) pyridine. The mixture was heated to 50° C. for 3 hrs, then left stirring at room temperature overnight. The solution was then added slowly and with vigorous stirring to a large excess of deionized water (18 M=resistivity), causing the polymer to precipitate as white stringy solid resin. The resin was repeatedly washed with deionized water and isolated by filtration, then dried under vacuum at 50° C. and 80° C. 3.02 g of resin were dissolved in 98.5 g of butylrolactone and filtered through a 1.0 micron filter.

Following example 1 but using this PI solution, a photo aligned alignment layer was obtained and examined. The result was a good and stable alignment. Varying the angle of illumination from 90° to 45° lead to an increase of the tilt angle from 0° to 3°.

TABLE 1

| Example No. | Monomers (mole %) | Time of irradiation (min) [1] | Angle of Incidence (degrees) | Tilt Angle (Initial) (degrees) | Tilt Angle (80° C./4 hr heat Treatment) (degrees) | VHR (5 min., 100° C.) (%) | RDC (mV) |
|---|---|---|---|---|---|---|---|
| 1 | BTDA/DAD (100/100) | 5 | 0 | 0 | 0 | 99.2 | 30 |
| 2 | BTDA/6FDA/DAD (50/50/100) | 5 | 0 | 0 | 0 | 99.2 | 30 |
| 3 | BTDA/DAD/Rf8DAM (100/93/7) | 5 | 45 | 3 | 2 | 98.5 | 60 |

[1] UV-intensity (polarized; 365 nm): 10 mW/cm$^2$

What is claimed is:

1. An alignment layer for liquid crystal displays made by the method comprising the steps of:

a) forming a solution from a solvent and substantially equimolar amounts of an aromatic tetracarboxylic dianhydride component containing 3,3',4,4'-benzophenone tetracarboxylic dianhydride and at least one aromatic diamine component of the group of the formula AI to AIII

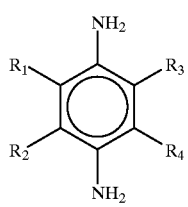

AI

-continued

AII

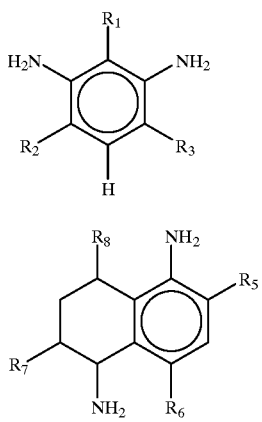

wherein $R_1$ to $R_4$ are alkyl groups containing from 1 to 4 carbon atoms and $R_5$ to $R_8$, which can be the same or different, are selected from the group hydrogen and alkyl groups containing 1 to 4 carbon atoms, with the proviso that at least two of $R_5$ to $R_8$ are alkyl groups;

b) polymerizing the aromatic tetracarboxylic dianhydride and the at least one aromatic diamine component to form a poly(amic) acid solution;

c) imidizing the poly(amic) acid in the solution to form polyimide and removing the polyimide therefrom;

d) casting the polyimide onto a substrate to form a thin coating layer; and e) exposing the thin coating layer of polyimide to polarized electromagnetic radiation.

2. An alignment layer for liquid crystal displays in accordance with claim 1 wherein said aromatic diamine component includes a diamine comonomer present up to 20 mole % based on the total molar amount of the aromatic diamine component, of at least one diamine comonomer of the formula A1 to A2

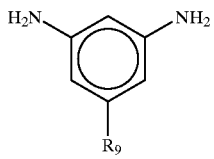
(A1)

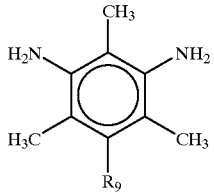
(A2)

wherein $R_9$ can be an alkyl of 1 to 16 carbon atoms, a fluoroalkyl of 1 to 16 carbon atoms, RfX where Rf is a perfluoroalkyl chain and X is the number of perfluorinated carbon atoms in the chain and X is from 1 to 16 carbon atoms, —OCH$_2$RfX, —CH$_2$RfX, —C(CH$_3$)$_2$RfX, —CH$_2$O(CH$_2$)$_{1-6}$-RfX, —COO(CH$_2$)$_2$-RfX, —CORfX, —COO—C$_6$H$_4$-RfX, —COO—C$_6$H$_4$—ORfX, —CONH—C$_6$H$_4$-RfX, —CONH—C$_6$H$_4$—ORfX, or —CONHRfX.

* * * * *

UNITED STATES PATENT AND TRADEMARK OFFICE
CERTIFICATE OF CORRECTION

PATENT NO.   : 6,348,245 B1                                                                Page 1 of 1
DATED        : February 19, 2002
INVENTOR(S)  : Brian Carl Auman, Melvin P. Zussman, Bernd Flebran and Edgar Bohm It is certified that error appears in the above-identified patent and that said Letters Patent is hereby corrected as shown below:

Column 21,
Lines 10-18, delete " 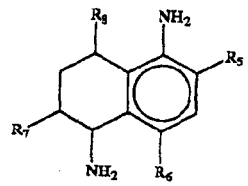 "

and substitute -- 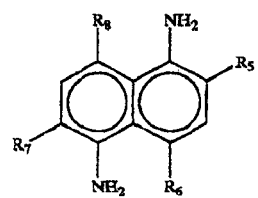 --

Signed and Sealed this

Seventeenth Day of December, 2002

JAMES E. ROGAN
*Director of the United States Patent and Trademark Office*